United States Patent
Parker (10) Patent No.: US 11,418,258 B2
(45) Date of Patent: Aug. 16, 2022

(54) POWER-EFFICIENT INTEGRATED PHOTONIC SWITCH

(71) Applicant: OpenLight Photonics, Inc., Goleta, CA (US)

(72) Inventor: John Parker, Goleta, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 12 days.

(21) Appl. No.: 17/001,931

(22) Filed: Aug. 25, 2020

(65) Prior Publication Data

US 2022/0069908 A1    Mar. 3, 2022

(51) Int. Cl.
| | |
|---|---|
| *G02F 1/01* | (2006.01) |
| *H04B 10/25* | (2013.01) |
| *G02F 1/015* | (2006.01) |
| *G02F 1/21* | (2006.01) |
| *G02F 1/025* | (2006.01) |

(Continued)

(52) U.S. Cl.
CPC .......... *H04B 10/25* (2013.01); *G02F 1/0113* (2021.01); *G02F 1/0147* (2013.01); *G02F 1/0151* (2021.01); *G02F 1/025* (2013.01); *G02F 1/212* (2021.01); *G02F 1/2252* (2013.01); *G02F 1/2257* (2013.01); *H04B 10/40* (2013.01); *H04J 14/0267* (2013.01);

(Continued)

(58) Field of Classification Search
CPC ....... H04B 10/25; H04B 10/40; G02F 1/0113; G02F 1/0147; G02F 1/0151; G02F 1/025; G02F 1/212; G02F 1/2252; G02F 1/2257; G02F 2201/063; H04J 14/0267; G02B 2006/12145; G02B 2006/12159
See application file for complete search history.

(56) References Cited

U.S. PATENT DOCUMENTS 5,044,715 A * 9/1991 Kawachi ............. G02B 6/2804
                                                        385/42
5,303,079 A   4/1994 Gnauck et al.
(Continued)

FOREIGN PATENT DOCUMENTS

| CN | 114114780 | 3/2022 |
|---|---|---|
| EP | 3541089 | 9/2019 |
| JP | 5081777 | 11/2012 |

OTHER PUBLICATIONS

"European Application Serial No. 20207845.7, Extended European Search Report dated Apr. 23, 2021", 11 pgs.

*Primary Examiner* — Ellen E Kim
(74) *Attorney, Agent, or Firm* — Schwegman Lundberg & Woessner, P.A.

(57) ABSTRACT

Power consumption in MZI-based integrated photonic switches or filters throughout the operational life can be reduced by reducing fabrication-induced phase misalignment between the unpowered operational mode of the switch or filter and the predominant switch state, and/or by enabling low-power compensation for any such misalignment. In various embodiments, misalignment is reduced by increasing the width of the waveguides implementing the interferometer arms of the MZI, and/or by structuring a region containing the MZI symmetrically to diminish stress-induced misalignment. In some embodiments, phase tuners are used to actively compensate for any phase misalignment, with a tuner drive voltage substantially lower than used to switch to the non-dominant state.

20 Claims, 7 Drawing Sheets

(51) Int. Cl.
  *G02F 1/225*      (2006.01)
  *H04B 10/40*      (2013.01)
  *H04J 14/02*      (2006.01)
  *G02B 6/12*       (2006.01)

(52) U.S. Cl.
  CPC ............ *G02B 2006/12145* (2013.01); *G02B 2006/12159* (2013.01); *G02F 2201/063* (2013.01)

(56) References Cited

U.S. PATENT DOCUMENTS

| | | | | |
|---|---|---|---|---|
| 6,925,217 | B2* | 8/2005 | Yamazaki | G02F 1/0147 385/14 |
| 7,333,690 | B1* | 2/2008 | Peale | G02B 6/12007 385/16 |
| 10,498,454 | B1* | 12/2019 | Anderson | G02F 1/225 |
| 10,890,717 | B2* | 1/2021 | Melloni | H04B 10/25 |
| 2013/0243362 | A1* | 9/2013 | Van Orden | H01S 3/08027 385/47 |
| 2014/0355979 | A1* | 12/2014 | Dorin | G02F 1/2257 398/27 |
| 2018/0062754 | A1* | 3/2018 | Dupuis | H04B 10/548 |
| 2018/0173024 | A1 | 6/2018 | Mcgreer et al. | |
| 2018/0203262 | A1* | 7/2018 | Epping | G02B 6/29353 |
| 2019/0265409 | A1* | 8/2019 | Baehr-Jones | H01S 5/50 |

* cited by examiner

POWER-EFFICIENT INTEGRATED PHOTONIC SWITCH

TECHNICAL FIELD

This disclosure relates to energy-efficient designs for photonic switches, in particular, as implemented with Mach-Zehnder interferometers (MZIs) in photonic integrated circuits (PICs).

BACKGROUND

Integrated photonic systems such as, e.g., PIC-implemented optical transceivers, often include one or more photonic (or, synonymously, optical) switches to selectively change, for a given wavelength of an optical signal, the signal power at an output port between a high-transmission, low-attenuation state (herein also simply "transmission state" or "on state") and a low-transmission, high-attenuation state (herein also "attenuation state" or "off") state"). The photonic switch may be implemented, for instance, using an MZI that includes, in one or both of its interferometer arms, an electronically controlled phase tuner adjustable to cause constructive or destructive interference at the output port. Photonic switches are typically maintained in one switch state (e.g., the attenuation state) over the majority of their operational life, and transition to the other state (e.g., the transmission state) only for brief periods. To minimize power consumption, it is therefore desirable to "align" the passive, unpowered operational mode of the switch with the predominant switch state. Further, optical transceivers and other photonic systems often use optical filters implemented by asymmetric MZIs (AMZIs) to align the wavelength of a tunable laser to a desired operational wavelength. The AMZI has an optical path-length difference between its interferometer arms that is designed to achieve maximum transmission (minimum loss) at the operational wavelength, thereby serving as a wavelength reference. In some cases, an AMZI including a phase tuner acts both as a switch and a filter, switch between "on" and "off" states and also providing a wavelength reference in the "on" state.

In practice, fabrication variations often result in misalignment of optical switches and filters, requiring the device to be actively powered over the duration of its operational life for high accuracy in maintaining high or low transmission at the operational wavelength. The need for continuous active powering increases control complexity and power consumption. This problem becomes significant for PICs with large numbers of switches or filters, such as, e.g., optical transceiver PICs with high lane counts, especially those with built-in self-test functionality, which may include five or more tunable switches per lane.

BRIEF DESCRIPTION OF THE DRAWINGS

In the following description of embodiments of the disclosed subject matter, reference is made to the accompanying drawings.

DESCRIPTION

Described herein are various approaches to lowering power consumption in MZI-based integrated photonic switches or filters over the lifetime of the device by reducing misalignment between the unpowered operational mode of the switch or filter and the predominant switch state and/or the operational wavelength, and/or by enabling low-power compensation for any such misalignment. One approach aims at reducing the degree of phase misalignment due to refractive-index changes resulting from fabrication variations in the waveguide width of the interferometer arms by increasing the waveguide width, thereby decreasing the sensitivity of the refractive index to width variations. In this approach, wider waveguides are generally accompanied by a greater waveguide bend radius to maintain single-mode operation. Another approach addresses strain-induced refractive-index or path-length changes by matching non-waveguide layers, including, in particular, any metal structures, on both sides of a symmetry axis of the MZI. To achieve symmetry, the PIC may, in a region surrounding the MZI, include "dummy" structures, that is, structures that do not have any function, but serve merely to match functional components (e.g., a heater implementing the phase tuner) on the other side of the symmetry axis. In yet another approach, applicable to switches (with or without filter functionality), the MZI is equipped with phase tuners in both interferometer arms to allow for active phase compensation for any misalignment resulting from fabrication variations. Electronic driver circuitry that controls and supplies power to the phase tuners includes a buck converter that provides a lower drive power for small adjustments in the predominant switch state, in which the switch is intended to be operated passively, and a higher drive power for operating in the active operational mode of the switch. In the description that follows, the operational mode in which the switch is operated passively except for any slight adjustments to compensate for phase misalignment (or "nominally passively"), is, for ease of reference, referred to as the "unbiased" mode, and the operational mode in which the switch is actively powered regardless of any misalignment is also referred to as the "biased" mode.

The following detailed description of the drawings further illustrates both the problem caused by fabrication variations in optical switches and filters as well as various example embodiments addressing this problem. While the discussion focuses on switches, its application to filters will be readily apparent to those of ordinary skill in the art.

Figure 1:
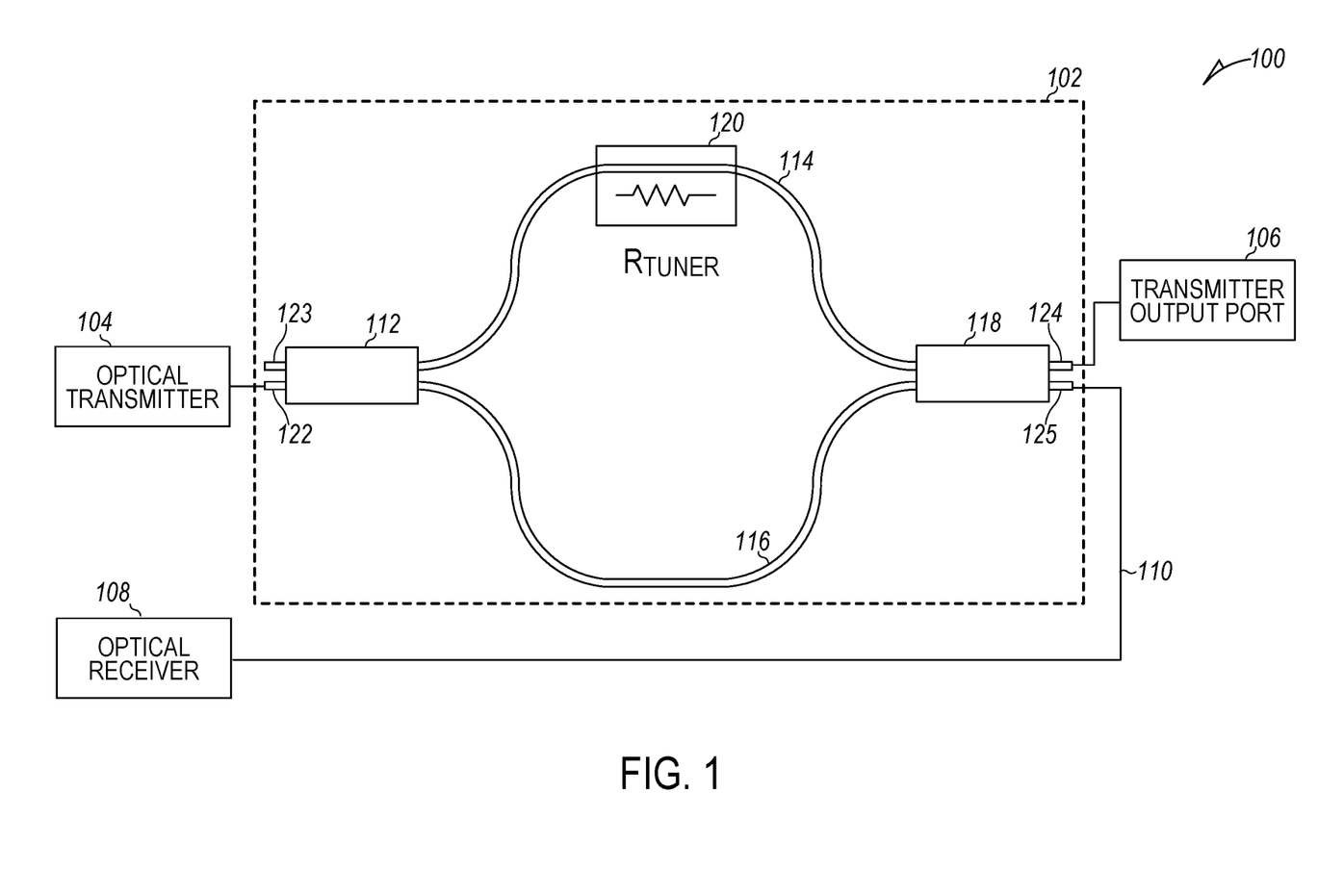
FIG. 1 is a conceptual diagram of an optical transceiver including an MZI-based photonic switch in accordance with various embodiments, illustrating the switch in the context of an example use case.

FIG. 1 is a conceptual diagram of an optical transceiver 100 including an MZI-based photonic switch 102 in accordance with various embodiments, illustrating the switch 102 in the context of an example use case. The optical transceiver 100 serves, e.g., within an optical communication system, to send and receive data imparted on optical signals. It includes an optical transmitter 104 with a laser to generate an optical carrier signal and an electronically controlled (electro-optic or electro-absorption) modulator that imparts an electronic input signal onto the laser light in the form of a phase and/or amplitude modulation to thereby generate the optical signal carrying the data to be transmitted. Optionally, the optical transceiver 100 may include multiple lasers emitting at multiple respective wavelengths, along with multiple associated modulators, whose outputs can be multiplexed into a multi-channel optical signal. Via an output port 106 of the transceiver 100, the optical signal may be coupled, e.g., to an outgoing optical fiber. The optical transceiver 100 further includes an optical receiver 108, e.g., implemented with a photodetector, that receives and converts a modulated optical input signal into an electronic output signal, from which data can then be extracted.

In the context of the optical transceiver 100, the photonic switch 102 may serve to direct the output of the optical transmitter 104 selectively either to the transmitter output port 106 during the normal operational mode (also "mission mode") or via an optical "loopback" path 110 to the optical receiver 108 in self-test mode. The self-test mode may be used, e.g., during wafer-level testing of a PIC implementing the optical transceiver 100 or during system-level testing of the complete transceiver package upon integration of the PIC with the associated electronics, to test the function of the optical receiver 108 using the built-in light source provided by the transmitter 104, or, conversely, to test the function of the optical transmitter 104 using the built-in receiver 108. In self-test mode, a functioning link from the transmitter 104 via the loopback path 110 to the receiver 108 with high received optical power and/or error-free data transmission indicates that both transmitter 104 and receiver 108 are working properly. (If the link is not working, subtests can be used to identify the source of the problem, e.g., employing monitor photodiodes after the laser, modulator, and through the loopback path.) Compared with the use of external light sources for receiver testing or external receivers for transmitter testing, this self-test functionality provides time and cost savings. Since the self-test mode is used only at the start of life of the optical transceiver 100, but disabled for the majority of its life, the switch 102 is desirably configured to be operated passively when coupling light into the output port 106 during mission mode, and to be actively powered only during self-test mode.

Turning now to the structure of the MZI-based photonic switch 102, the switch may generally be implemented, along with the optical transmitter 104 and the optical receiver 108, as part of a PIC in a semiconductor-on-insulator substrate, such as, e.g., a silicon-on insulator (SOI) substrate including a silicon device layer on top of a buried oxide (BOX) or other dielectric layer. While the description of various example embodiments references, specifically, silicon implementations, it is to be understood that other semiconductor material platforms may also be used. Optionally, the SOI (or other) substrate may include a cladding layer disposed on top of the device layer, which may embed various components of the switch 102 (e.g., the phase tuners discussed below) and the PIC at large.

The switch 102 generally includes an optical input coupler 112, two interferometer arms 114, 116, and an optical output coupler 118 collectively forming an MZI. As shown, the MZI may be geometrically symmetric, with interferometer arms 114, 116 being equal in length. Alternatively, the MZI may be asymmetric, having a path-length difference between the interferometer arms 114, 116 that causes the output intensity to vary periodically with the wavelength of the light, such that the MZI switch simultaneously serves as an optical filter. In either case, the MZI includes, in at least one of the interferometer arms 114, a phase tuner 120 that allows adjusting the relative phase between the signals interfering at the output coupler 118. The interferometer arms 114, 116 may be implemented by optical waveguides (e.g., rib waveguides) formed in the (e.g., silicon) device layer of the PIC substrate. The phase tuner 120 may generally be any device adapted to change the refractive index in the waveguide 114 in a controllable manner, e.g., electro-optically or thermo-optically. For example, in some embodiments, a thermal phase tuner implemented by a controllable-power resistive heater placed adjacent (e.g., above or next to) the waveguide 114, is used. In other embodiments, the phase tuner 120 includes a PN or PiN junction formed in the waveguide, e.g., having a U shape formed by a two-dimensional doping concentration profile in the waveguide cross section.

The input and output couplers 112, 118 may be implemented, for instance, by rectangular multi-mode interferometers (HMIs) each configured as a 2×2 couplers with two input ports and two output ports, as shown. At the input coupler 112, one of the input ports (e.g., port 122) may receive the optical signal from the optical transmitter 104; the other input port (e.g., port 123) may remain unused. At the output coupler 108, one of the output ports (e.g., port 124) may serve to provide the optical signal to the transmitter output port 106, whereas the other output port (e.g., port 125) couples the optical signal into the loopback path 110. The phase tuner 120 can be operated to switch the output signal between these two output ports 124, 125. In some embodiments, the switch, when including an AMZI, doubles as a multiplexer, combining two optical signals of different wavelengths received at the two input ports 122, 123 into a multiplexed output signal at the output ports 124 (in unbiased mode), 125 (in biased mode).

Note that, even if only one of the two input ports 122, 123 is utilized, implementing the input coupler 112 in a symmetric MZI as a 2×2 coupler is beneficial in that it allows achieving the "on" state at port 124 and the "off state" at port 125 at zero power (whereas, with a symmetric MZI having a 1×2 input coupler and a 2×2 output coupler, $\pi/2$ or $3\pi/2$ tuning would be used in this state). In an AMZI-based optical switch/filter, on the other hand, a 1×2 input coupler may be used in conjunction with a 2×2 output coupler, as the phase offset associated with the input coupler can, in this case, be compensated for by the path difference in the AMZI arms. In general, alternatively to MMIs, other types of couplers, such as directional couplers, evanescent waveguide couplers, or waveguide Y-junctions (where 1×2 couplers are adequate) may also be used for the input and output coupler 112, 118.

MZI-based photonic switches 102, although described above with reference to an example use for switching between mission and test modes, can also serve various other purposes. For example, photonic switches are often used as variable optical attenuators in the receiver path of an optical transceiver, where they are ordinarily kept in a high-transmission state, but occasionally set to low transmission to attenuate high input optical power to prevent damage to the receiver. In another example, photonic switches are used in the loopback path 110 in the low-transmission state during mission mode to prevent transmitter light from reaching the receiver 108; only during self-test is the loopback path 110 enabled and the loopback switch is changed to a high-transmission state. As these examples illustrate, the predominant switch state (for which the switch is configured to operate in the unbiased mode) may correspond to the transmission state or the attenuation state of the switch, depending on the particular application. Note also that, if a switch with two output ports is used, high transmission at one port corresponds to low transmission at the other port. Further, in the loopback path 110, as well as in other applications where the light is either transmitted or attenuated, but not switched between ports, the input coupler need not include two input ports, and the output coupler need not include two output ports. Rather, a single input port at the input coupler and a single output port at the output coupler may suffice, allowing for the use of, e.g., waveguide Y-junctions or 1×2 MMI couplers. The same holds for AMZIs implementing optical filters, which may have a single output port transmitting light only at a specified wavelength within a filter period.

Figure 2:
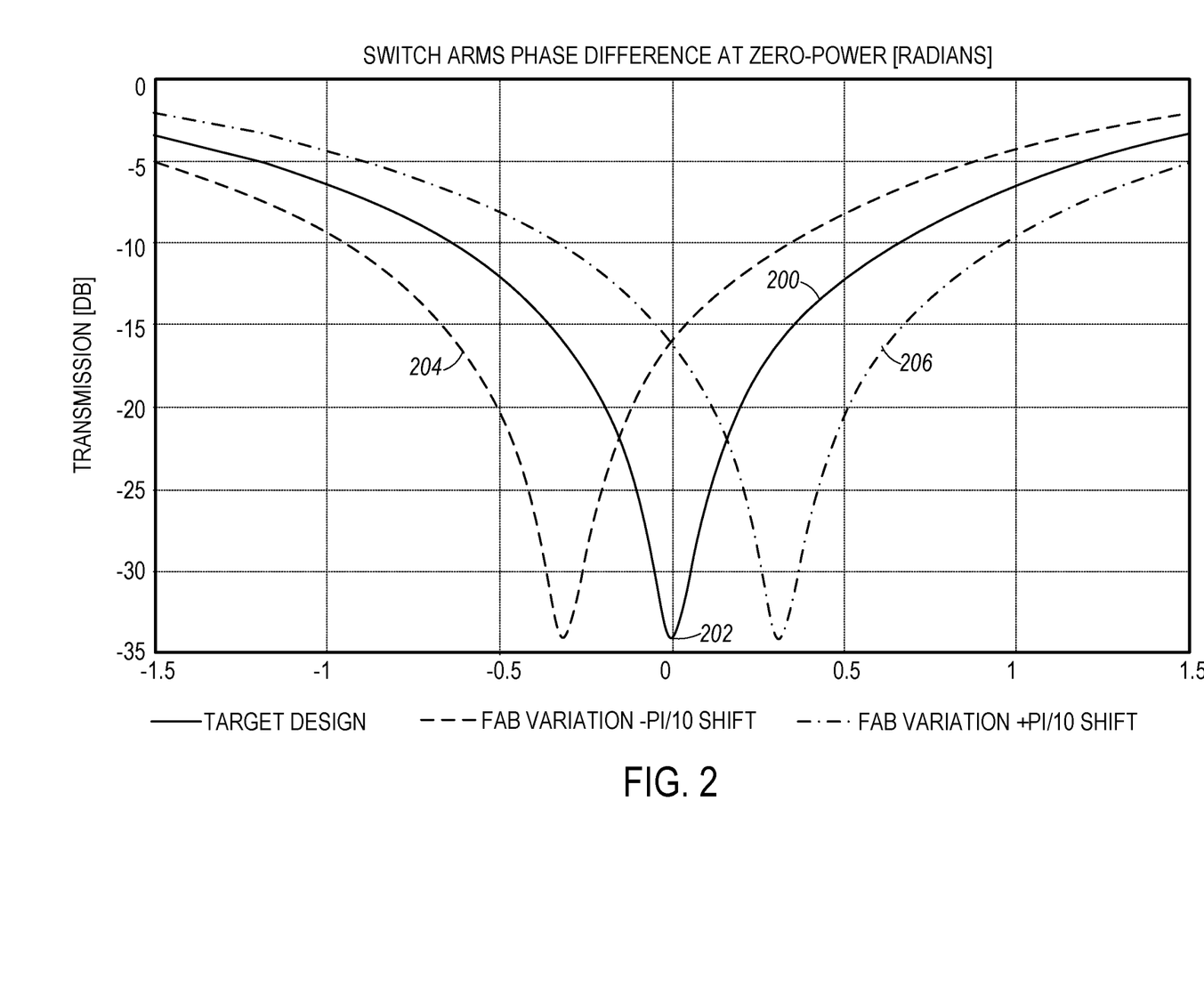
FIG. 2 are graphs of the optical transmission of an MZI-based photonic switch as a function of the relative phase shift between the interferometer arms for an example target design as well as for example deviations from the target design due to fabrication variations.

FIG. 2 are graphs of the optical transmission of an MZI-based photonic switch 102 as a function of the relative phase shift between the interferometer arms 114, 116 for an example target design as well as for example deviations from the target design due to fabrication variations. The phase shift is given in radians along the abscissa, and the relative transmission is indicated on a logarithmic scale (in decibel) along the ordinate. The depicted graph is for an output port of the photonic switch that is intended to be in attenuation state in the predominant operational mode of the switch, such as, e.g., the port 125 at the loopback path 110 of switch 102 in the example of FIG. 1. For such a port, the transmission curve 200 for the target design, which corresponds to passive switch operation, exhibits a transmission minimum 202 at a zero phase shift between the interferometer arms 114, 116; at this minimum 202, the optical signal input to the switch is attenuated to about −34 dB (which is about 0.04% of the input intensity). The residual transmitted light is a consequence of a power imbalance of about 1% between the interferometer arms 114, 116 (with power coupling of 49% and 51%, rather than the nominal 50%) that is typical of optical couplers in practice.

Fabrication variations can cause the transmission minimum to shift to positive or negative phase offsets. If the transmission minimum shifts to a relative phase shift of $\pm\pi/10$, as indicated by curves 204, 206, the attenuation at phase shift of zero will be only about −16 dB (which is about 2.5% of the input intensity). In other words, the amount of light that is still transmitted in the attenuation (or "off") state has increased by a factor of about 60 as a result of the fabrication variation. Such poor blocking of light in the "off" state may not be tolerable. For example, with a switch 102 used, as shown in FIG. 1, to switch an optical transceiver 100 between self-test and mission modes, designed to transmit all light to the transmitter output port 106 at zero relative phase shift and operate in the "off" state for the loopback port 125, residual transmission of 2.5% of the optical power into the loopback path 110 might interfere with the operation of, or even cause damage to, the optical receiver 108. To avoid this problem, the optical switch 102 may need to be actively powered even in the "off" state. The following drawings illustrate various approaches to lower the transmission in the "off" state sufficiently to avoid a need for active powering, or at least lower the power requirements associated with the "off" state. As will be appreciated by those of ordinary skill in the art given the benefit of this specification, the same principles can be straightforwardly applied to maximize the transmission in the "on" state of a photonic switch or a filter. Indeed, in a switch with two output ports, minimizing transmission in one port inherently maximizes transmission in the other port.

Figure 3:
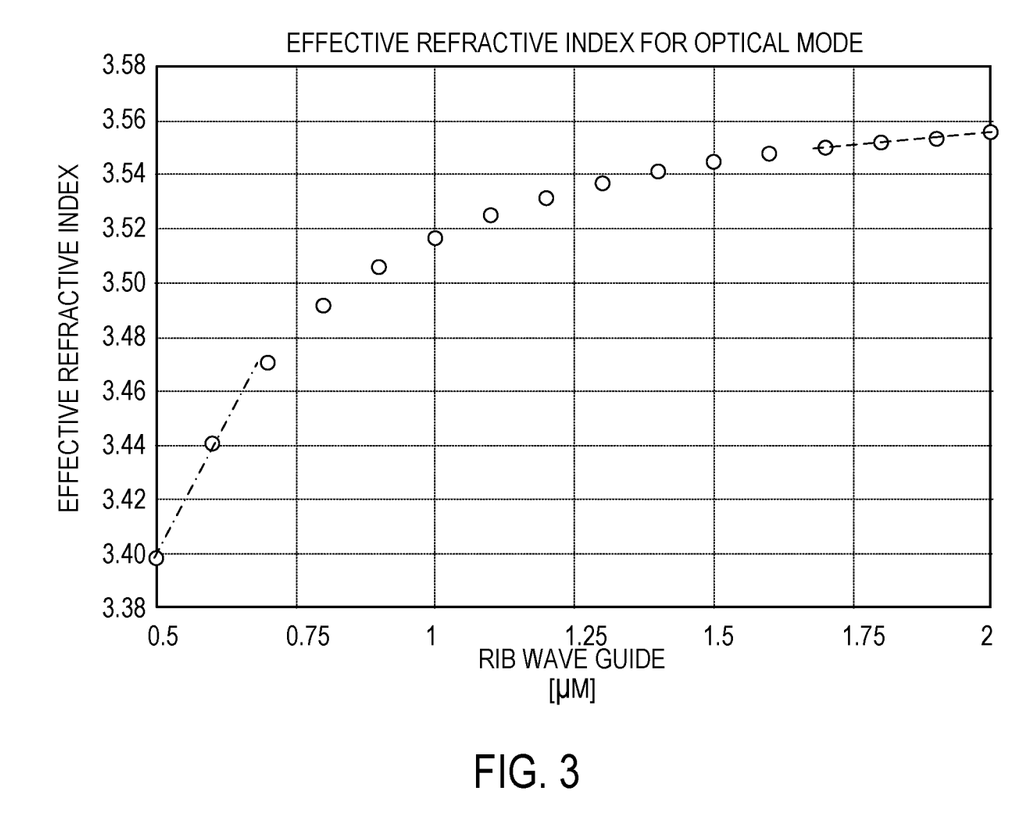
FIG. 3 is a graph of the effective refractive index of an example rib waveguide as a function of width.

FIG. 3 is a graph of the effective refractive index of an example rib waveguide as a function of width. Rib waveguides, which often serve as the interferometer arms 114, 116 of the MZI-bases switch 102, are created by partially etching the (silicon) device layer to form a waveguide with rectangular cross section on top of a wider (silicon) slab. The effective refractive index experienced by a fundamental optical mode in a rib waveguide depends, in addition to the bulk refractive index of the waveguide, on the precise waveguide geometry and the refractive index of the surrounding cladding. For example, for a silicon-dioxide-clad silicon rib waveguide having a thickness of about 0.5 μm, the refractive index of the fundamental mode at a wavelength of 1300 nm is around 3.5, but varies slightly as a function of rib width. As shown in FIG. 3, for waveguide widths ranging from 0.5 μm to 2 μm, the effective refractive index may vary between 3.40 and 3.56. The sensitivity of the effective refractive index to variations is greater for smaller widths. Thus, a fabrication variation of, for instance, ±50 nm in waveguide width will change the effective refractive index at a width of 2 μm by only about 0.002, whereas the same variation at a waveguide width of 0.5 μm changes the refractive index by about 0.016. A wider waveguide can tolerate greater width variation between the interferometer arms 114, 116 without creating an excessive refractive index difference, and thus phase shift, between them. In some embodiments, this relationship between waveguide width and sensitivity to fabrication variation is exploited to reduce phase misalignment due to variations in waveguide width by designing the switch with wider waveguides.

Figure 4A:
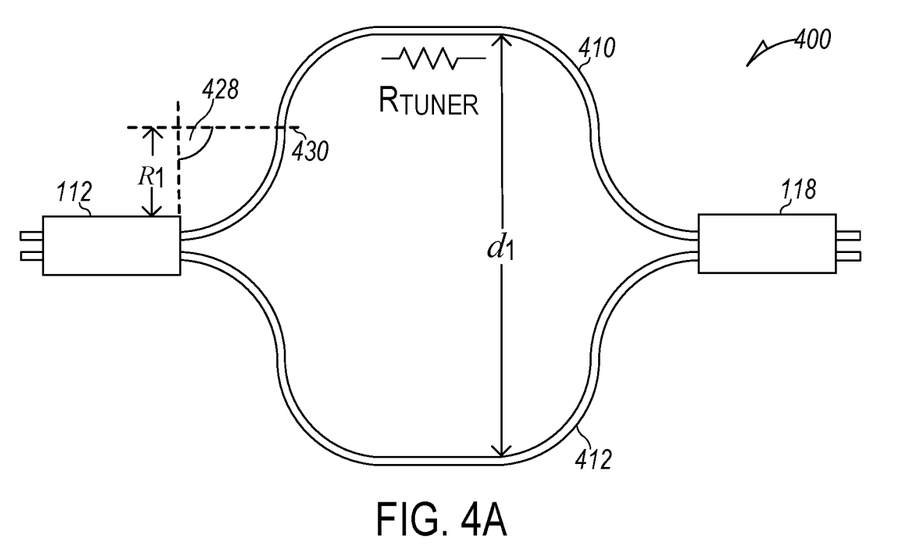
FIGS. 4A and 4B are schematic top views of example MZI-based optical switches, contrasting a conventional waveguide configuration (FIG. 4A) with a more fabrication-tolerant waveguide configuration in accordance with one or more embodiments (FIG. 4B).
Figure 4B:
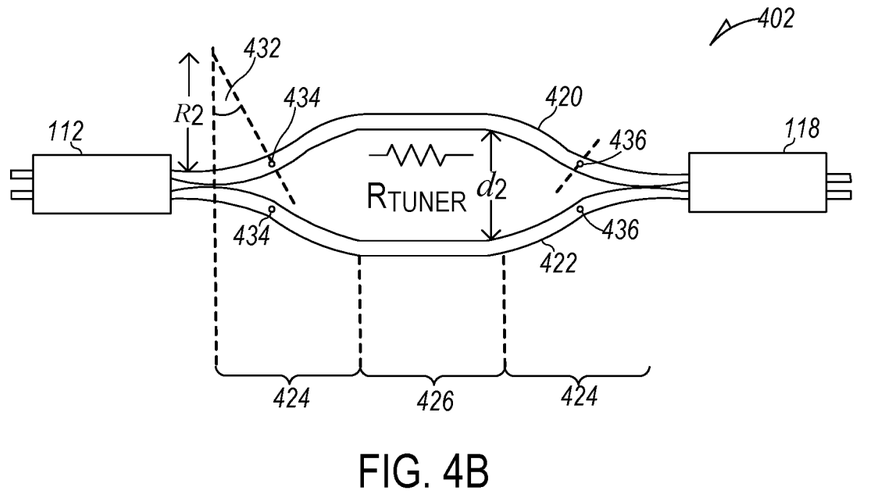

FIGS. 4A and 4B are schematic top views of example MZI-based optical switches or filters 400, 402, contrasting a conventional waveguide configuration (switch 400) with a more fabrication-tolerant waveguide configuration (switch 402) in accordance with one or more embodiments. Both switches 400, 402 are generally similar to the photonic switch 102 depicted in FIG. 1 in that they each include two geometrically symmetric waveguides 410, 412 and 420, 422, respectively, coupled between an optical input coupler 112 and an optical output coupler 118. The two switches 400, 402 differ, however, in the dimensions of their waveguides 410, 412 and 420, 422. The waveguides 410, 412, 420, 422 may all be rib waveguides. In the conventional configuration, rib widths, e.g., on the order of 0.5 μm are often used; this small width serves to accommodate a small bending radius to rapidly separate the two waveguide arms 410, 412 of the switch for thermal isolation between the two sides. As shown, the waveguides 420, 422 of the fabrication-tolerant switch 402 are significantly wider, e.g., by a factor of at least 1.5, than the waveguides 410, 412 in the conventional switch 400. In some embodiments, the waveguide width is increased to greater than 1 μm. This increased width achieves lower sensitivity to fabrication variations, as described above. However, the optical waveguide width is generally limited, in the embodiments contemplated herein, by the desire to guide only the fundamental optical mode; once the waveguide width exceeds a certain limit, additional spatial optical modes are launched, resulting in interference between modes, which reduces signal quality and, thus, adds a penalty to optical data transmission.

This undesirable effect of the increased waveguide width can be counteracted by simultaneously increasing the bend radius along the waveguides. In various embodiments, therefore, the smallest bend radius of the waveguides 420, 422 in the fabrication-tolerant switch 400 is increased (to radius $R_2$), relative to the smallest bend radius along the waveguides 410, 412 of the conventional switch 400 (radius $R_1$), to allow for the greater waveguide width while maintaining single-mode operation. In some embodiments, the smallest bend radius $R_2$ is at least 100 µm. To keep, despite the increase in bend radius, the length of the MZI (corresponding to the distance between the input and output couplers 112, 118) the same, the two waveguides 420, 422 are brought closer to each other, and the bend angles that they undergo in the curved waveguide sections 424 that connect the parallel, straight center sections 426 to the input and output coupler 112, 118, respectively, are decreased.

To illustrate: in the depicted switches 400, 402, each of the curved waveguide sections (424 in FIG. 4B) connecting a straight center waveguide section (426 in FIG. 4B) to either the input coupler 112 or the output coupler 118 has an approximate S-shape rotationally symmetric about an inflection point. In the example conventional configuration shown in FIG. 4A, each waveguide 410, 412 incurs a 90° bend angle 428 between the output of the input coupler 112 and the inflection point 430 (drawn in only for waveguide 410), and then another 90° bend angle in the other direction from the inflection point 430 to the straight waveguide section, where the waveguides 410, 412 are again parallel. Similarly, the waveguides 410, 412 each incur two 90° bend angles in opposite directions between the straight waveguide sections and the input to the output coupler 118. In the fabrication-tolerant configuration shown in FIG. 4B, by contrast, the bend angle 432 from the input coupler to the inflection points 434, from the inflection point 434 to the straight waveguide section 426, from the straight waveguide section 426 to the inflection point 436, and from the inflection point 436 to the output coupler 118 are each only about 30°. In some embodiments, the bend angle is kept even lower, e.g., to less than 20°. As a result of the decreased bend angle, the separation distance $d_2$ between the waveguide 420, 422 has been significantly reduced. For example, whereas the separation distance $d_1$ between the waveguide 410, 412 in the conventional switch 400 may be between 100 and 200 µm or even greater, the separation distance $d_2$ between the wider waveguide 420, 422 with increased bend radius may be reduced to less than 50 µm, incidentally to changing the bend radius.

The specific values of various angles and dimensions mentioned above are provided to illustrate by way of example, but not limitation, how a given MZI-based switch design can be modified to achieve greater fabrication tolerance via greater waveguide widths while maintaining single-mode operation and avoiding an undesirable increase in the footprint of the switch. Those of ordinary skill in the art will know how to apply the general principles to any given MZI-based switch configuration taken as a starting point. It is noted that bringing the two waveguide arms of the MZI too close together can lower the thermal tuning efficiency of a heater-based phase tuner 120 because the closer the waveguides, the greater will be the effect of dissipating heat on the non-heated waveguide. With thermo-optic phase tuners, therefore, the proposed approach to increasing fabrication tolerance is counterintuitive, and presents a tradeoff between thermal tuning efficiency and increased fabrication tolerance. However, the improved fabrication tolerances reduce the mission-mode power consumption, whereas the closer MZI arm spacing increases self-test power consumption, which is far more power-tolerant. In various embodiments, for a given waveguide path as characterized by the distance between input and output couplers 112, 118, the waveguide separation (which is kept at least large enough to achieve acceptable tuning efficiency), and the bend angles, the waveguide width is chosen to be as large as possible consistent with single-mode waveguiding at the operational wavelength, or at least greater than 70%, preferably greater than 90%, of that maximum width for single-mode operation. In various example embodiments, the switch or filter has a total length from input to output of less than 1 mm, and a separation between the straight waveguide sections of the interferometer arms between about 5 µm and about 50 µm. The smallest bend radius of the arms may be between 100 µm and 500 µm, and the waveguide widths may be between 1 µm and 2 µm.

Apart from variability in waveguide width, different stresses acting on the waveguide arms 114, 116 of the MZI due to non-uniformity in the surrounding structures can change the refractive indices and/or path lengths of the waveguides 114, 116, causing or contributing to phase misalignment during passive switch operation. In various embodiments, this problem is addressed by designing a portion of the PIC surrounding the MZI-based switch to be symmetric about a geometric symmetry axis of the switch.

Figure 5A:
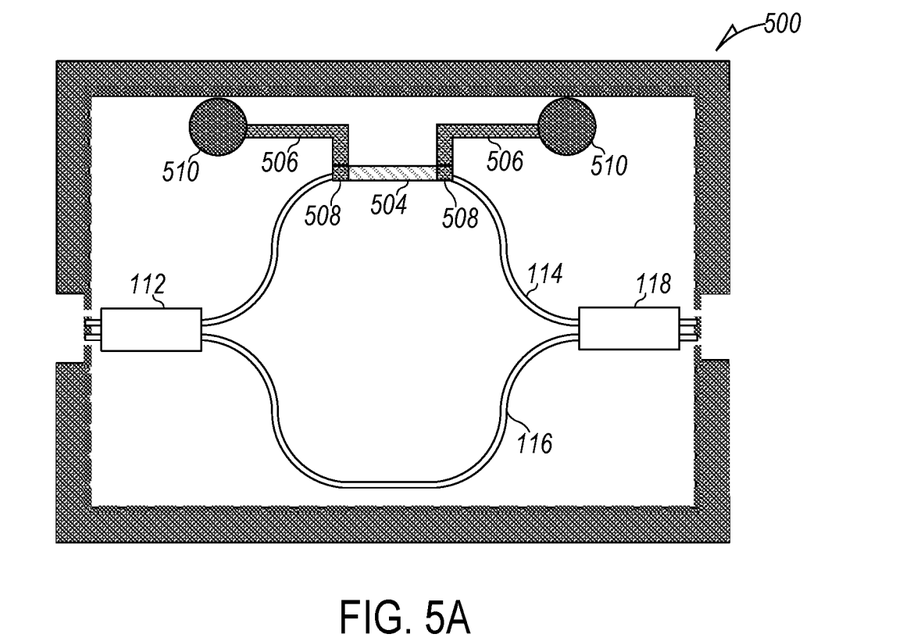
FIGS. 5A and 5B are schematic top views of example MZI-based photonic switches and the surrounding non-waveguiding layers, contrasting an asymmetric conventional configuration (FIG. 5A) with a more fabrication-tolerant symmetric configuration in accordance with one or more embodiments (FIG. 5B).
Figure 5B:
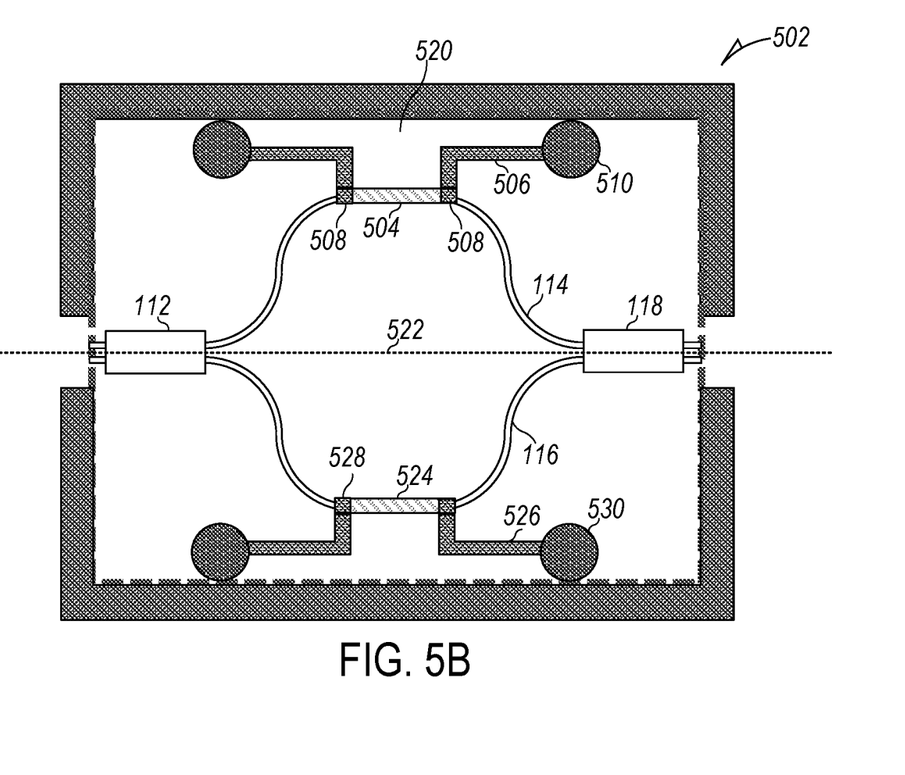

FIGS. 5A and 5B are schematic top views of example MZI-based optical switches and the surrounding non-waveguiding layers, contrasting an asymmetric conventional configuration 500 with a more fabrication-tolerant symmetric configuration 502 in accordance with one or more embodiments. In addition to the silicon structures of the MZI-based switch, which include the input and output couplers 112, 118 and the waveguides 114, 116, FIGS. 5A and 5B also illustrate various metal structures associated with the MZI. The metal structures include a heating element 504 disposed above one of the waveguide arms 114, along with one or more layers of redistribution metal 506 and vertical metal vias 508 embedded in the cladding as well as metal bumps 510 (for solder bumps) collectively providing the metal connections for applying a current through the heating element 504. If, in lieu of a heater, another type of electronically controlled phase tuner (e.g., an electrically driven PN junction) is used, the MZ may include similar metal structures. In addition, metal structures or other embedded structures (e.g., III-V layers) associated with devices other than the MZI may extend, in some cases, into a region circumscribing the MZI. All these structures can subject the waveguides 114, 116 to strain, thereby affecting their relative phase in the passive operational mode. To balance out such strain effects, any structures that may affect the optical path length of one waveguide are duplicated for the other waveguide, rendering a region surrounding the MZI structurally symmetric.

In more detail, with reference to FIG. 5B, a symmetry region 520 centered about a geometric axis 522 of the MZI that extends between the waveguides 114, 116 and through the input coupler 112 and the output coupler 118 is defined. The symmetry region 520 may, for instance, be chosen to be rectangular in shape, and is generally sized to fully contain the MZI including input and output couplers 112, 118 as well as the structural components of the phase tuner 120. Inside the symmetry region 520, the device layer and cladding layer of the PIC, including any embedded structures, are made symmetric about the axis 522. For example, mirroring the heating element 504 and associated metal connections in one waveguide arm 114, a second heating element 524, along with all redistribution metal 526, vertical metal vias 528, and metal bumps 530 is added to the other waveguide arm 116, regardless whether that second heater is used or not. In some embodiments, both heaters are used for phase adjustments between the two waveguide arms 114, 116 (e.g., as discussed below with reference to FIGS. 6 and 7), but, in other embodiments, only one of the heaters is ultimately used. In general, any functional device component or structure on one side of the axis 522 may be mirrored by a structurally substantially identical, but non-functional "dummy" component.

In PICs, regions that are not patterned for device structures are often patterned with a "dummy" silicon or metal fill that has no device function, but serves to achieve a desired density requirement, e.g., to render the silicon density across the silicon device layer or across any metal layers as homogenous as possible. The fill pattern may, for instance, include a regular array of silicon islands sized and spaced to match the average density of areas containing the waveguides or other silicon device structures. In various embodiments, the symmetry region 520 is free of any such dummy fill to avoid introducing asymmetries. To elaborate, dummy fill is usually added by the foundry after device design in any allowed regions. The resulting fill is not fully symmetric around every device, but merely "quasi-symmetric" due to dummy fill spacing. Consider, for instance, a switch that is about 900 μm long and about 200 μm wide, and a dummy fill with feature sizes between 5 and 10 μm. The dummy fill is subject to the constraints that the metal dummy fill does not overlap with any metal traces and that the silicon dummy fill does not overlap with the waveguide. Depending on how the dummy fill pattern is positioned relative to the switch, these constraints can cause more dummy fill (e.g., one extra row of fill features) to be placed on one side of the switch than on the other, resulting in a different phase due to local stress differences from the dummy fill. This issue is avoided, in accordance with various embodiments, by excluding the defined symmetry region from dummy fill patterning during device manufacture, that is, treating the boundary of the symmetry region as a "keepout" outline.

The embodiments of FIGS. 4B and 5B may be used alone or in combination to reduce phase misalignment between the passive, unbiased operational mode and the predominant switch state as may result from fabrication-induced waveguide width variations and/or stresses on the waveguide interferometer arms of the MZI. As will be appreciated by those of ordinary skill in the art, these approaches are equally applicable to (pure) optical filters, where they can help reduce phase misalignment between the transmission peak during passive operation of the filter and the desired operational wavelength (e.g., of a laser to be aligned with the filter).

For photonic switches that operate predominantly in one state, which by design is generally chosen to coincide with the unbiased operational mode, another approach to reducing or eliminating phase misalignment is to actively adjust the phase in the unbiased operational mode to phase-align the two interferometer arms, but in a power-efficient manner. Phase-aligning the interferometer arms is herein understood to adjust the phase difference between the interferometer arms to zero for a symmetric MZI, and to tune the phase difference between the interferometer arms to the nominal, desired value for an AMZI. Using resistive heating for phase adjustments, the phase in the heated waveguide arm can be tuned in only one direction. With PN-junction-based phase tuners, the junction can, in principle, be forward or reverse-biased, but since it is much more efficient in forward bias, standard operation is to use the switch in forward bias only, thereby limiting phase tuning to one direction. To allow compensating for any phase misalignment in either direction, various embodiments therefore utilize (e.g., heater-based or PN-junction-based) phase tuners in both waveguide interferometer arms. Active phase alignment may be used in conjunction with the fabrication-tolerant waveguide and layer designs described above to further reduce power requirements.

Figure 6:
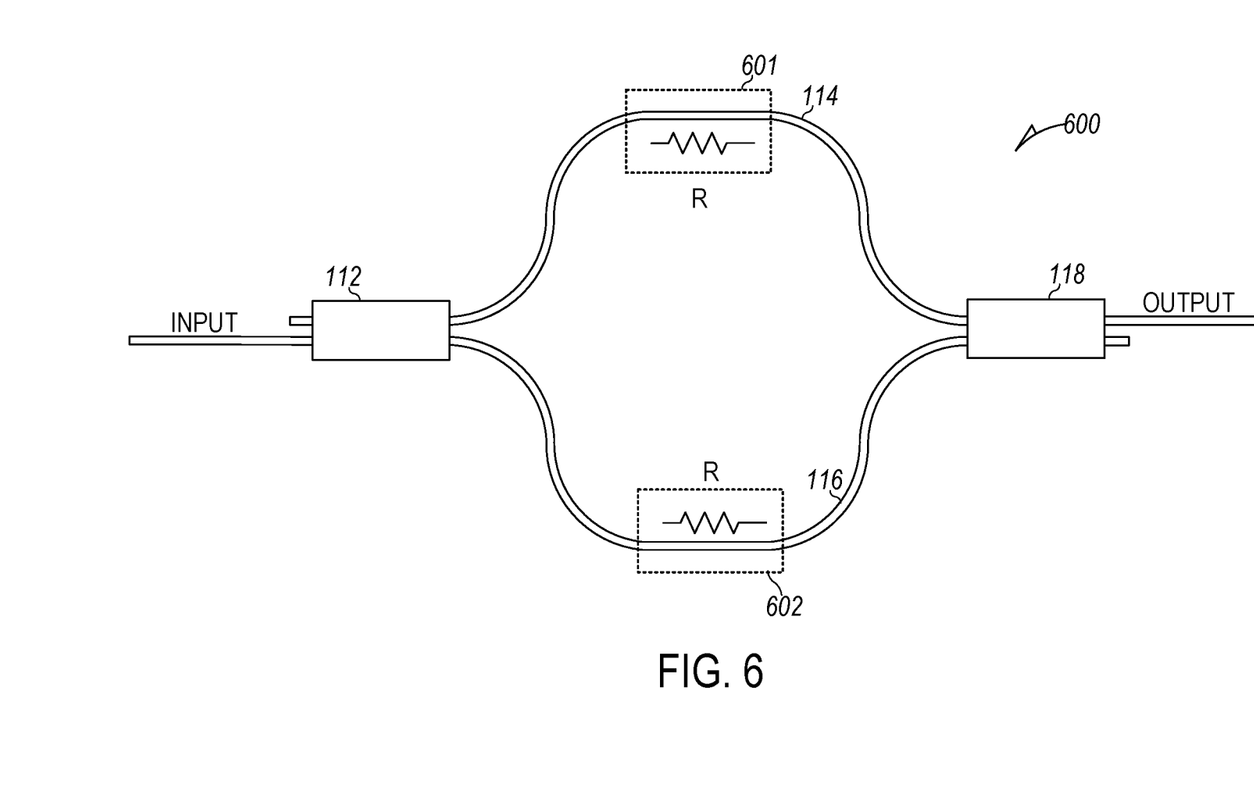
FIG. 6 is a schematic top view of an example MZI-based photonic switch with phase tuners in both interferometer arms, in accordance with one or more embodiments.

FIG. 6 is a schematic top view of an example MZI-based optical switch 600 with phase tuners 601, 602 in both interferometer arms 114, 116, in accordance with one or more embodiments. For definiteness, the tuner 601 in one arm 114 is herein called the "upper phase tuner ($R_{tuner, upper}$)", and the tuner 602 in the other arm 116 is referred to as the "lower phase tuner ($R_{tuner, lower}$)." The phase tuners 601, 602, which are both implemented by resistive heaters in the depicted example, change the relative phase between the two interferometer arms 114, 116 in mutually opposite directions, enabling compensation for any fabrication-induced phase misalignment. For example, for a target switch design having a transmission minimum at a phase shift of zero, as indicated by curve 200 in FIG. 2, if fabrication variations have resulted in a shift of the transmission minimum to a negative relative phase, corresponding to curve 204, the upper phase tuner 601 may be used to shift the curve back to the target design; conversely, if fabrication variations have caused the transmission minimum to shift to a positive relative phase, corresponding to curve 206, the lower phase tuner 602 may be used to shift it back to zero. A photonic switch with a pair of phase tuners, thus, allows compensating actively for any deviations from the target design. To minimize the power requirements associated with such active tuning in the predominant switch state, electronic circuitry associated with the phase tuners 601, 602 is configured, in accordance with various embodiments, to supply low power for the small adjustments in the unbiased (nominally passive) switch mode while providing higher power for operating the photonic switch 600 in the biased mode.

Figure 7:
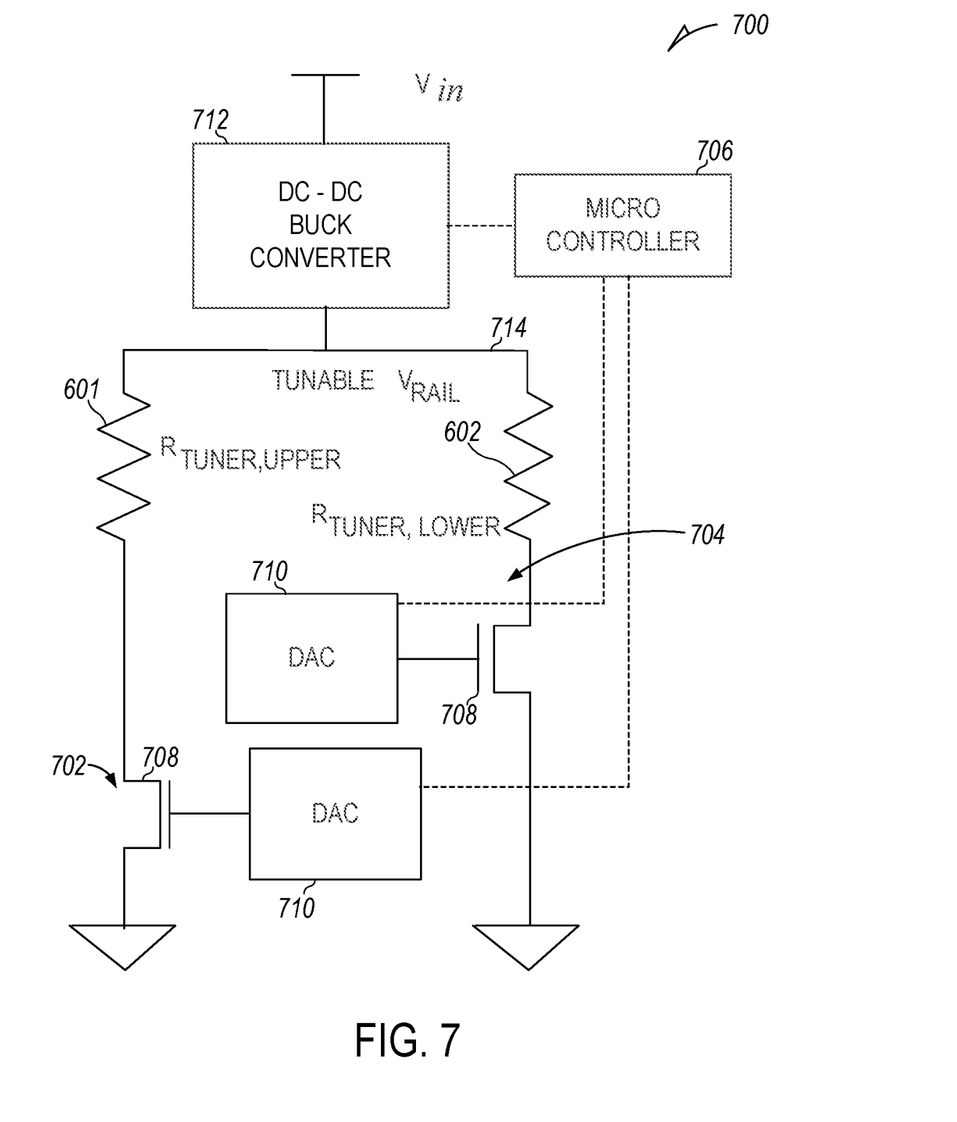
FIG. 7 is a circuit diagram of electronic driver circuitry for adjusting the power supplied to the phase tuners of the photonic switch of FIG. 6, in accordance with one or more embodiments.

FIG. 7 is a circuit diagram of electronic driver circuitry 700 for adjusting the power to the phase tuners 601, 602 of the photonic switch 600 of FIG. 6, in accordance with one or more embodiments. The electronic driver circuitry 700 includes a first driver 702 associated with the upper phase tuner 601, a second driver 704 associated with the lower phase tuner 602, and a microcontroller 706 to control the first and second drivers 702, 704. The first and second drivers 702, 704 may each include a transistor 708 in series with the resistive heater implementing the respective phase tuner 601 or 602, and a digital-to-analog converter (DAC) 710 that, based on a control signal from the microcontroller 706, adjusts the control voltage applied at the gate (also "gate voltage") of the respective transistor 708 to thereby controllably tune the current through the phase tuner 601 or 602. The transistors 708 may be, e.g., field-effect transistors (FETs). In some embodiments, the control voltage is tuned along a continuum of voltages similar to a low-dropout linear voltage regulator. In other embodiments, the DACs 710 are pulse-width modulated DACs (PWM DACs) that vary the duty cycle of a pulse train according to the input digital code, thereby varying the duty cycle of the phase tuners 601, 602 and, thus, the average current through the phase tuners 601, 602. In various embodiments, the PWM time period (that is, the time before the signal repeats) is faster than the thermal response time of the heaters implementing the phase tuners 601, 602 (e.g., 100 ns PWM time period and 1 µs thermal time constant), such that a constant PWM duty cycle results in a constant temperature on the heater and the PWM duty cycle is not visible on the heater, but is instead the average of the PWM signal. The pulsed output of the PWM DACs 710 ensures that the FET transistors 708 are fully ON or OFF and not in-between, which results in lower power dissipation on the FET transistors 708. However, a PWM DAC can typically not operate at <1% of its full range. Therefore, with a phase tuner 601, 602 driven by a fixed voltage, phase alignments involving <1% adjustments are accomplished by tuning the phase tuner to $2\pi$ plus the desired phase adjustment to be within the operating range of the PWM DAC, wasting $2\pi$ worth of tuning power, which would be saved if the phase tuner 601, 602 could operate at a lower power setting.

The electronic circuitry 700 further includes a DC-DC buck converter 712 that converts a fixed input voltage $V_{in}$ to a tunable output voltage $V_{rail}$ at a voltage rail 714 to which the upper and lower phase tuners 601, 602 are connected in parallel. Buck converters are well-known to those of ordinary skill in electronics. The buck converter 712 is responsive to control signals from the microcontroller 706, and serves to adjust the output voltage $V_{rail}$ between a low drive voltage and high drive voltage supplied to the phase tuners 601, 602.

In the predominant switch state (corresponding, e.g., to the attenuation state), in which the switch 600 is intended to be operated passively, the buck converter 712 sets the output voltage $V_{rail}$ to a lower drive voltage, such that the drivers 702, 704 can, via the control voltages or duty cycle applied at the transistors 708, effect fine adjustments to the (average) current through, and thus heat generated by, the phase tuners 601, 602, and thus to the relative phase shift between the interferometer arms 114, 116. Such fine adjustments may be based on measurements of the optical power received at one or both output ports of the MZI. The photonic switch may, for instance, include taps and monitor photodiodes at the output ports, and provide the photodiode output signals to the microcontroller 706 for use as feedback to drive the phase tuners 601, 602 via the drivers 702, 704. For example, the drivers 702, 704 may be controlled to adjust the phases at the phase tuners 601, 602 until the optical power detected at the port that is intended to be "off" is substantially zero.

To operate the switch in the biased mode (e.g., to enable switching to transmission state), the buck converter 712 sets the output voltage $V_{rail}$ to a higher drive voltage for the phase tuners 601, 602. In some embodiments, the lower drive voltage for phase alignment is about 0.5 V, whereas the higher drive voltage for the biased operational mode of the switch is about 2.5 V. Since the power dissipation of a thermal phase tuner is proportional to the square of the voltage, this fivefold change in drive power corresponds to a 25-fold change in power dissipation at the max DAC setting (i.e., the full range setting) for a PWM DAC. In this manner, by switching between a lower drive power in the unbiased operational mode and a higher driver power in the biased operational mode, the buck converter 712 reduces the power consumed to compensate for any phase misalignment in the unbiased operational mode. In addition, for drivers 702, 704 with a given dynamic range of the control voltage, the buck converter 712 effectively increases the dynamic range for tuning the phase, allowing fine phase adjustments in the unbiased state while also facilitating sufficient phase adjustments to switch between transmission and attenuation.

The following numbered examples are illustrative embodiments:

1. An integrated optical switch or filter comprising: a semiconductor-on-insulator substrate comprising a semiconductor device layer; a Mach-Zehnder interferometer formed in the semiconductor device layer, the Mach-Zehnder interferometer comprising an input coupler, an output coupler, and two waveguide arms connected between the input coupler and the output coupler; and at least a first phase tuner associated with one of the waveguide arms, wherein bend radii of the two waveguide arms are greater than 100 µm along entire lengths of the waveguide arms.

2. The integrated optical switch or filter of example 1, wherein the two waveguide arms comprise parallel straight center sections, first curved sections connecting the center sections to the input coupler, and second curved sections connecting the center sections to the output coupler, each of the first curved sections and second curved sections including an inflection point, wherein bend angles of the first curved sections between the input coupler and the inflection points and between the inflection points and the straight center sections and bend angles of the second curved sections between the straight center sections and the inflection points and between the inflection points and the output coupler each do not exceed 30°.

3. The integrated optical switch or filter of example 2, wherein a distance between the straight center sections does not exceed 50 µm.

4. The integrated optical switch or filter of any of examples 1-3, wherein a waveguide width of the two waveguide arms is greater than 70% of a maximum waveguide width consistent with single-mode waveguiding at an operational wavelength of the integrated optical switch.

5. The integrated optical switch or filter of any of examples 1-4, wherein a waveguide width of the two waveguide arms is greater than 90% of a maximum waveguide width consistent with single-mode waveguiding at an operational wavelength of the integrated optical switch.

6. The integrated optical switch or filter of any of examples 1-5, further comprising a second phase tuner associated with the other one of the waveguide arms and an electronic driver circuit comprising a first driver associated with the first phase tuner, a second driver associated with the second phase tuner, a microcontroller to control the first and second drivers to switch between biased and unbiased operational modes and to phase-align the two waveguide arms in the unbiased operational mode, and a buck converter to adjust, responsively to the microcontroller, a drive power supplied to the first and second phaser tuners between a lower power for phase-aligning and a higher power in the biased operational mode.

7. The integrated optical switch or filter of any of examples 1-6, wherein the first phase tuner comprises one of a resistive heater or a PN junction.

8. An integrated optical switch or filter comprising: a semiconductor-on-insulator substrate comprising a semiconductor device layer and a cladding layer disposed above the semiconductor device layer; a Mach-Zehnder interferometer formed in the semiconductor device layer, the Mach-Zehnder interferometer comprising an input coupler, an output coupler, and two waveguide arms connected between the input coupler and the output coupler; and a first phase tuner associated with one of the two waveguide arms and a second phase tuner associated with the other one of the two waveguide arms, wherein, within a symmetry region of the substrate that is centered about a geometric axis through the input coupler and the output coupler and that fully contains the Mach-Zehnder interferometer and the first and second phase tuners, the semiconductor device layer and cladding layer are structured symmetrically about the axis.

9. The integrated optical switch or filter of example 8, wherein each of the first and second phase-tuners comprises a heater disposed above the associated waveguide arm and metal connections to metal bumps on the cladding layer.

10. The integrated optical switch or filter of example 8 or example 9, wherein the symmetry region contains at least one pair of a functional device component and a corresponding dummy component structurally mirror-symmetric to the functional device component about the geometric axis.

11. The integrated optical switch or filter of any of examples 8-10, wherein the cladding layer comprises at least one or more layers of redistribution metal or one or more vias.

12. The integrated optical switch or filter of any of examples 8-11, wherein the semiconductor device layer is free of dummy fill inside the symmetry region.

13. The integrated optical switch or filter of any of examples 8-12, wherein bend radii of the two waveguide arms are greater than 100 µm along entire lengths of the waveguide arms.

14. The integrated optical switch or filter of any of examples 8-13, further comprising an electronic driver circuit comprising a first driver associated with the first phase tuner, a second driver associated with the second phase tuner, a microcontroller to control the first and second drivers to switch between biased and unbiased operational modes and to phase-align the two waveguide arms in the unbiased operational mode, and a buck converter to adjust, responsively to the microcontroller, a drive power supplied to the first and second phase tuners between a lower power for phase-aligning and a higher power in the biased operational mode.

15. The integrated optical switch or filter of any of examples 8-14, wherein the first phase tuner comprises one of a resistive heater or a PN junction.

16. An integrated optical switch comprising: a semiconductor-on-insulator substrate comprising a semiconductor device layer; a Mach-Zehnder interferometer formed in the semiconductor device layer, the Mach-Zehnder interferometer comprising an input coupler, an output coupler, and two waveguide arms connected between the input coupler and the output coupler; a first phase tuner associated with one of the two waveguide arms and a second phase tuner associated with the other one of the two waveguide arms; and an electronic driver circuit comprising a first driver associated with the first phase tuner, a second driver associated with the second phase tuner, a microcontroller to control the first and second drivers to switch between biased and unbiased operational modes and to phase-align the two waveguide arms in the unbiased operational mode, and a buck converter to adjust, responsively to the microcontroller, a drive power supplied to the first and second phase tuners between a lower power for phase-aligning and a higher power in the biased operational mode.

17. The integrated optical switch of example 16, wherein the first and second driver each include a driver transistor operating at duty cycle or gate voltage applied by a digital-to-analog converter controlled by the microcontroller.

18. The integrated optical switch of example 16 or example 17, configured such that the unbiased operational mode coincides with a predominant switch state.

19. The integrated optical switch of claim 18, wherein the Mach-Zehnder interferometer is asymmetric and configured to maximize transmission at a specified operational wavelength.

20. An optical switching method comprising: coupling an optical input signal into a Mach-Zehnder interferometer formed in a semiconductor device layer of a semiconductor-on-insulator substrate; driving phase tuners associated with waveguide arms of the Mach-Zehnder interferometer to switch an optical output signal exiting the Mach-Zehnder interferometer at an output port between two states corresponding to biased and unbiased operational modes of the Mach-Zehnder interferometer, and to phase-align the waveguide arms in the unbiased operational mode; and using a buck converter to switch a drive power supplied to the phase tuners between a lower power for phase alignment in the unbiased operational mode and a higher power for operation in the biased operational mode.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

What is claimed is:

1. An integrated optical device comprising:
a semiconductor-on-insulator substrate comprising a semiconductor device layer;
a Mach-Zehnder interferometer formed in the semiconductor device layer, the Mach-Zehnder interferometer comprising an input coupler, an output coupler, and two waveguide arms connected between the input coupler and the output coupler; and
at least a first phase tuner associated with one of the waveguide arms,
wherein bend radii of the two waveguide arms are greater than 100 µm along entire lengths of the waveguide arms,
wherein the two waveguide arms comprise parallel straight center sections, first curved sections connecting the center sections to the input coupler, and second curved sections connecting the center sections to the output coupler, and a distance between the straight center sections not exceeding 50 µm, and
wherein a waveguide width of the two waveguide arms is greater than 70% of a maximum waveguide width consistent with single-mode waveguiding at an operational wavelength of the integrated optical device.

2. The integrated optical device of claim 1, wherein each of the first curved sections and second curved sections includes an inflection point, and wherein bend angles of the first curved sections between the input coupler and the inflection points and between the inflection points and the straight center sections and bend angles of the second curved sections between the straight center sections and the inflection points and between the inflection points and the output coupler each do not exceed 30°.

3. The integrated optical device of claim 1, wherein the waveguide width of the two waveguide arms is greater than 90% of the maximum waveguide width consistent with single-mode waveguiding at the operational wavelength of the integrated optical device.

4. The integrated optical device of claim 1, further comprising a second phase tuner associated with the other one of the waveguide arms and an electronic driver circuit comprising a first driver associated with the first phase tuner, a second driver associated with the second phase tuner, a microcontroller to control the first and second drivers to switch between biased and unbiased operational modes and to phase-align the two waveguide arms in the unbiased operational mode, and a buck converter to adjust, responsively to the microcontroller, a drive power supplied to the first and second phase tuners between a lower power for phase-aligning and a higher power in the biased operational mode.

5. The integrated optical device of claim 1, wherein the first phase tuner comprises one of a resistive heater or a PN junction.

6. An integrated optical device comprising:
a semiconductor-on-insulator substrate comprising a semiconductor device layer and a cladding layer disposed above the semiconductor device layer;
a Mach-Zehnder interferometer formed in the semiconductor device layer, the Mach-Zehnder interferometer comprising an input coupler, an output coupler, and two waveguide arms connected between the input coupler and the output coupler; and
a first phase tuner associated with one of the two waveguide arms and a second phase tuner associated with the other one of the two waveguide arms,
wherein, within a symmetry region of the substrate that is centered about a geometric axis through the input coupler and the output coupler and that fully contains the Mach-Zehnder interferometer and the first and second phase tuners, the semiconductor device layer and cladding layer are structured symmetrically about the axis, and
wherein the cladding layer comprises at least one or more layers of redistribution metal or one or more vias.

7. The integrated optical device of claim 6, wherein each of the first and second phase-tuners comprises a heater disposed above the associated waveguide arm and metal connections to metal bumps on the cladding layer.

8. The integrated optical device of claim 6, wherein the symmetry region contains at least one pair of a functional device component and a corresponding dummy component structurally mirror-symmetric to the functional device component about the geometric axis.

9. The integrated optical device of claim 6, wherein the semiconductor device layer is free of dummy fill inside the symmetry region.

10. The integrated optical device of claim 6, wherein bend radii of the two waveguide arms are greater than 100 μm along entire lengths of the waveguide arms.

11. The integrated optical device of claim 6, further comprising an electronic driver circuit comprising a first driver associated with the first phase tuner, a second driver associated with the second phase tuner, a microcontroller to control the first and second drivers to switch between biased and unbiased operational modes and to phase-align the two waveguide arms in the unbiased operational mode, and a buck converter to adjust, responsively to the microcontroller, a drive power supplied to the first and second phase tuners between a lower power for phase-aligning and a higher power in the biased operational mode.

12. The integrated optical device of claim 6, wherein the first phase tuner comprises one of a resistive heater or a PN junction.

13. An integrated optical switch comprising:
a semiconductor-on-insulator substrate comprising a semiconductor device layer;
a Mach-Zehnder interferometer formed in the semiconductor device layer, the Mach-Zehnder interferometer comprising an input coupler, an output coupler, and two waveguide arms connected between the input coupler and the output coupler;
a first phase tuner associated with one of the two waveguide arms and a second phase tuner associated with the other one of the two waveguide arms; and
an electronic driver circuit comprising a first driver associated with the first phase tuner, a second driver associated with the second phase tuner, a microcontroller to control the first and second drivers to switch between biased and unbiased operational modes and to phase-align the two waveguide arms in the unbiased operational mode, and a buck converter to adjust, responsively to the microcontroller, a drive power supplied to the first and second phase tuners between a lower power for phase-aligning and a higher power in the biased operational mode.

14. The integrated optical switch of claim 13, wherein the first and second driver each include a driver transistor operating at duty cycle or gate voltage applied by a digital-to-analog converter controlled by the microcontroller.

15. The integrated optical switch of claim 13, configured such that the unbiased operational mode coincides with a predominant switch state.

16. The integrated optical switch of claim 15, wherein the Mach-Zehnder interferometer is asymmetric and configured to maximize transmission at a specified operational wavelength.

17. An optical switching method comprising:
coupling an optical input signal into a Mach-Zehnder interferometer formed in a semiconductor device layer of a semiconductor-on-insulator substrate;
driving phase tuners associated with waveguide arms of the Mach-Zehnder interferometer to switch an optical output signal exiting the Mach-Zehnder interferometer at an output port between two states corresponding to biased and unbiased operational modes of the Mach-Zehnder interferometer, and to phase-align the waveguide arms in the unbiased operational mode; and
using a buck converter to switch a drive power supplied to the phase tuners between a lower power for phase alignment in the unbiased operational mode and a higher power for operation in the biased operational mode.

18. The optical device of claim 1, wherein the optical device is an optical switch.

19. The optical device of claim 1, wherein the optical device is an optical filter.

20. The optical device of claim 6, wherein the optical device is an optical switch.

* * * * *